United States Patent [19]

Goutzoulis et al.

[11] Patent Number: 4,928,310
[45] Date of Patent: May 22, 1990

[54] PSEUDORANDOM PULSE CODE GENERATORS USING ELECTRO-OPTICAL XOR GATES

[75] Inventors: Anastosios P. Goutzoulis, Pittsburgh; David K. Davies, Churchill Borough, both of Pa.

[73] Assignee: Westinghouse Electric Corp., Pittsburgh, Pa.

[21] Appl. No.: 380,959

[22] Filed: Jul. 17, 1989

[51] Int. Cl.$^5$ ............................................. H04L 9/02
[52] U.S. Cl. ................................... 380/46; 350/96.14; 331/78; 364/713; 364/717
[58] Field of Search ................. 364/713, 717; 331/78; 350/96.13, 96.14

[56] References Cited

U.S. PATENT DOCUMENTS

| | | | |
|---|---|---|---|
| 3,681,708 | 8/1972 | Olmstead | 331/78 |
| 3,691,472 | 9/1972 | Bohman | 380/46 X |
| 3,995,311 | 11/1976 | Taylor | 350/96.14 |
| 4,531,022 | 7/1985 | Pioli | 331/78 |
| 4,632,518 | 12/1986 | Jensen | 364/713 X |
| 4,712,089 | 12/1987 | Verber | 341/137 |
| 4,833,633 | 5/1989 | Morris | 364/717 |

OTHER PUBLICATIONS

H. F. Taylor, "Guided Wave Electrooptic Devices For Logic And Computation".
"Applied Optics", May 15, 1978; vol. 17, No. 10, pp. 1493–1498.

*Primary Examiner*—Stephen C. Buczinski
*Assistant Examiner*—Bernarr Earl Gregory
*Attorney, Agent, or Firm*—W. G. Sutcliff

[57] ABSTRACT

Pseudorandom pulse code generators utilize XOR gates constructed of a pair of back to back parallel connected laser diodes, and fiber optic delay lines connecting the XOR gates to generate PN code sequences with tens of Gbits/s data rates. The single tap generator uses a fiber optic line of a length representing a selected number of delay stages connected to the optical output of the XOR gate and with optical splitters at the end of the delay line and at a selected delay stage feeding back optical signals to the optical inputs of the XOR gate to produce the PN sequence at the end of the delay line. Multi-tap generators utilize additional electro-optical XOR gates connected in serial-parallel, or preferably in a converging cascade arrangement to feed back pulses to the delay line. A syncopated PN code generator uses the electro-optical XOR gates to multiplex codes generated by syncopated pairs of relatively slow electronic shift register code generators with the required phase shifting provided by difeence in the lengths of the optic fibers connected successive stages of XOR gates.

23 Claims, 4 Drawing Sheets

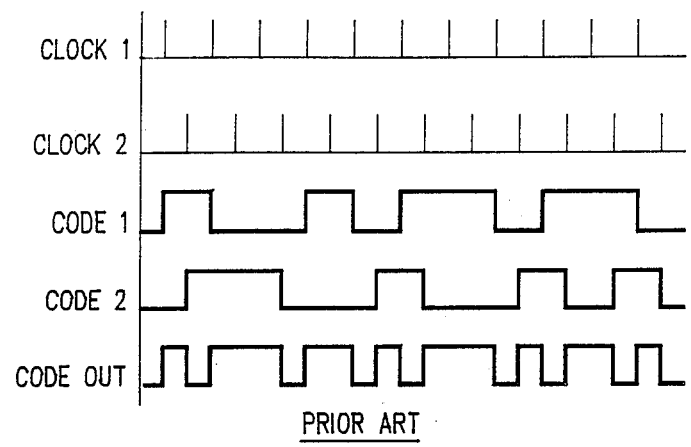
FIG. 4
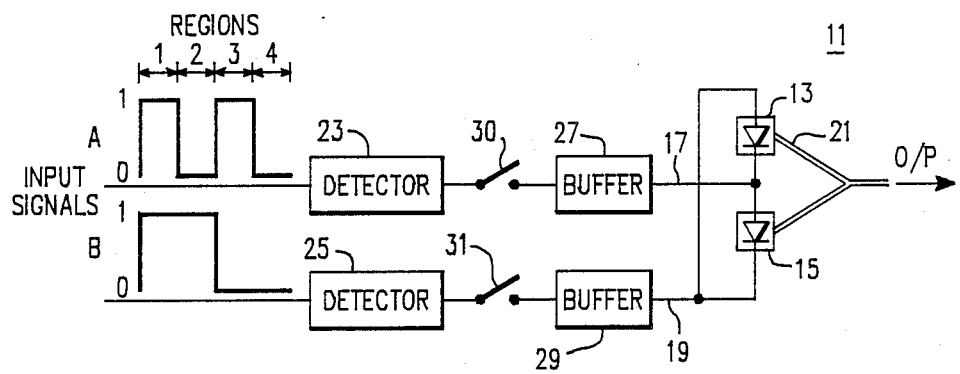
FIG. 5
| REGION | A | B | LD 13 | LD 15 | O/P |
|---|---|---|---|---|---|
| 1 | 1 | 1 | 0 | 0 | 0 |
| 2 | 0 | 1 | 1 | 0 | 1 |
| 3 | 1 | 0 | 0 | 1 | 1 |
| 4 | 0 | 0 | 0 | 0 | 0 |
FIG. 6

PSEUDORANDOM PULSE CODE GENERATORS USING ELECTRO-OPTICAL XOR GATES

BACKGROUND OF INVENTION

CROSS REFERENCE TO RELATED APPLICATION

Our commonly owned, concurrently filed United States patent application entitled "Opto-Electrical Exclusive OR Logic Gates" which is identified by Attorney Docket No. 54,708, U.S. Pat. application No. 07/380967.

FIELD OF THE INVENTION

This invention relates to code generators utilizing XOR gates in feedback loops to generate pseudorandom (PN) pulse codes and in particular to such pulse code generators utilizing optical XOR gates and fiber optic delay lines to generate pseudorandom pulse codes at tens of GHz pulse rates.

BACKGROUND INFORMATION

Pseudorandom (PN) pulse code generators are used in many applications such as, for example, in code-division multiplexing, secure communications and radar systems. A simple conventional pseudorandom pulse code generator is implemented electronically by a linear shift register and a modulo-2 adder, also known as an exclusive OR (XOR) gate. Such a code generator 1 is shown in FIG. 1. The outputs from two specific stages 7 of a shift register 5 are fed into an XOR gate 3 to form the input to the shift register. The output of any stage is then a binary sequence. If the shift register has n stages, the maximum length of the generator sequence is $2^n - 1$. By choosing the feedback connections, or combinations of connections, properly, the output is a sequence of maximal length (i.e. the longest code that can be generated by a shift register with n delay stages).

Often a large number of code sequences is needed for applications such as code-division multiplexing. Under these conditions, multiple feedback points are necessary. An example of such a multi-tap code generator 1' utilizing a serial-parallel configuration of XOR gates 3 is shown in FIG. 2. Using all possible combinations of feedback taps for an n-stage shift register 5, there are $[f(2^n - 1)]/n$ maximal sequences that can be generated by connecting the appropriate feedback points, where $f(2^n - 1)$ is an Euler number. The Euler number is the number of positive integers including 1 that are relatively prime to and less than $2^n - 1$. To reduce the total delay for large numbers of feedback paths, the XOR gates 3 may be connected in a converging cascade arrangement rather than the serial-parallel arrangement of FIG. 2.

The speed of the PN code generator depends upon: (1) the speed of the XOR gates, (2) the maximum clock speed of the delay stages, and (3) the total delay between the XOR gates and the shift register. Currently available gallium arsenide (GaAs) technology is capable of PN data generation with up to 2 Gbits/s data rates. For certain applications, this rate is acceptable; however there are applications, such as for example, fiber optic secure communications or satellite-to-satellite communications, that demand, or could use, data rates of several tens of Gbits/s. For example, for single-mode-ultra-secure fiber optic networks using spread spectrum techniques, spreading code data rates in the range of tens of Gbits/s would be required. For such applications there are no known techniques for generating PN sequences.

One technique for generating high PN data rates utilizes the syncopated register generator (SRG) which multiplexes, through the XOR operation, two or more relatively slow code generators to produce an output sequence with a data rate which is N times the data rate of the multiplexed generators, where N is the number of multiplexed generators. Separate clocks phase-shifted by 360/N degrees, each operating at a rate of R/N, where R is the desired output code bit rate, are used. FIG. 3 shows an example of a two-register syncopated generator 7 in which two electronic pulse code generators or registers 9 are multiplexed by the electronic XOR gate 3. FIG. 4 illustrates the timing for the SRG of FIG. 3. While the SRG produces a PN code at a data rate which exceeds that of the individual registers, it is still limited to about the 2 Gbits/s rate currently available with electronic XOR gates.

There is a need therefore for PN generators which can generate codes at tens of Gbits/s data rates.

There is a need for such PN generators which can generate codes of unlimited length at these data rates.

There is a further need for such PN generators which occupy little real estate and can be implemented in integrated circuits.

SUMMARY OF THE INVENTION

These and other needs are satisfied by the subject invention which is directed to pseudorandom (PN) code generators implemented with electro-optical XOR gates. In accordance with one aspect of the invention, such PN code generators comprise a plurality of electro-optical XOR gates each having at least two optical inputs and one optical output. Optic fiber means interconnect the optical outputs of selected XOR gates to selected inputs of other of the XOR gates in a pattern which generates a single optical output at which the pseudorandom digital code is generated as a sequence of light pulses. The optic fiber means includes fibers having lengths selected to effect selected delays in the transmission of light pulses between the electro-optical XOR gates to produce the pseudorandom sequence of light pulses.

In one embodiment of the invention, the optic fiber means includes optic fibers connecting the plurality of XOR gates in a converging cascade arrangement which funnels the light pulses injected into a preselected number of the XOR gates to a single XOR gate. A fiber optic delay line having a plurality of delay stages is connected to the optical output of the cascaded XOR gates. A plurality of optical splitters connect selected ones of the delay stages in the delay line to the optical inputs of the preselected number of XOR gates. An optical combiner injects optical input pulses into the delay line to initiate code generation. The generated code appears at the output of the fiber optic delay line.

A simplified version of this embodiment utilizes a single optical XOR gate having one optical input connected by an optical splitter to the end of the fiber optic delay line and an additional optical splitter providing feedback to a second optical input of the XOR gate from another selected delay stage in the delay line. The output of the single XOR gate is applied to the input of the delay line through a combiner which also injects the initializing pulses.

Another embodiment of the invention is a syncopated code generator which utilizes a number of pairs of low speed electronic PN code generators or registers and two sets of XOR gates. The first set of XOR gates each have two electronic inputs and a single optical output. Each of these gates is connected to the output of a pair of the syncopated electronic PN code generators. Delay circuits delay the clock pulses to one of the registers in each pair by one half the clock rate. A second set of XOR gates each having two optical inputs and a single optical output are connected by pairs of optical fibers to the optical outputs of the first set of XOR gates in a converging cascade arrangement to funnel pulses from the separate electronic PN code generator to a single electro-optical XOR gate which produces the optical PN pulse code. One optic fiber in each pair is longer than the other by an amount which delays pulses transmitted by it by one half the bit width of the pulses transmitted by the pair. In this manner, an optical PN code is generated at a rate equal to the number of electronic PN code generators times their clock rate.

The XOR gates utilized in the invention comprise a pair of diode-type light sources, preferably laser diodes, which are connected back to back in parallel by a pair of input leads. With an electrical signal on one input lead, one of the diode-type light sources is forward biased to emit and the other is reversed biased. With the signals on the input leads both high or both low, neither diode-type light source emits. A fiber optic combiner gathers light from both diode-type light sources to provide the single optical output of the XOR gate. For the first set of XOR gates in the syncopated register code generator, the electronic outputs of the electronic registers are applied directly to the input leads, preferably through a buffer amplifier. For the optical XOR gates, an optical detector converts optical signals into electrical logic signals on the input leads, again preferably through buffer amplifiers. The input leads may also include switches which can be used for instance in the case of the cascaded XOR gates feeding into the multistage line to adjust the code generated.

BRIEF DESCRIPTION OF THE DRAWINGS

A full understanding of the invention can be gained from the following description of the preferred embodiments when read in conjunction with the accompanying drawings in which:

FIG. 4 is a timing diagram illustrating signals generated by the prior art syncopated register electronic PN code generator of FIG. 4.

FIG. 5 is a schematic diagram of an electro-optical XOR gate used in the optical PN code generators of the invention.

FIG. 6 is a truth table illustrating the logic of the XOR gate of FIG. 5.

DESCRIPTION OF THE PREFERRED EMBODIMENTS

Figure 1:
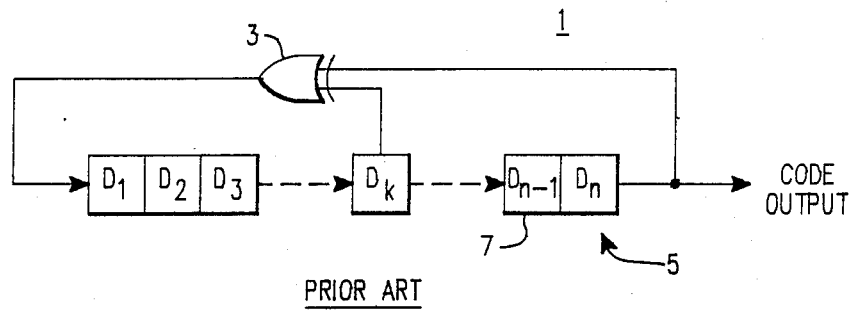
FIG. 1 is a schematic diagram of a prior art single tap electronic PN code generator.

The PN code generators of the invention utilize XOR gates having at least two optical inputs and a single optical output. A preferred form of such a gate is disclosed and claimed in our commonly owned, concurrently filed application entitled "Opto-Electrical Exclusive OR Logic Gates" which is identified by Attorney Docket No. W.E. 54,708, U.S. Pat. application No. 07/380967. FIG. 5 illustrates such an XOR gate 11 in which first and second diode-type light sources, in this case laser diodes, 13 and 15, are electrically connected back to back, that is with the anode of each laser diode connected to the cathode of the other, in parallel by first and second input leads 17 and 19. Light emitted by the laser diodes 13 and 15 is gathered by optical combiner 21 which produces a single optical output signal 0/P.

Photodetectors 23 and 25 convert optical input signals A and B into electronic signals which are applied to the input leads 17 and 19 through buffer amplifiers 27 and 29, respectively. Preferably, switches 30 and 31 are provided in the input leads 17 and 19.

The XOR gate 11 of FIG. 5 performs the exclusive OR operation on optical logic signals A and B applied to the photodetectors 23 and 25 respectively. The operation of the XOR gate 11 can be understood from consideration of the optical output signal 0/P derived from the gate as a result of the input signals A and B of different time durations as shown schematically in FIG. 5. These signals A and B can take two values, "0" corresponding to no light, and "1" corresponding to a light of sufficient intensity to generate a voltage on the lead 17 or 19 which is at least equal to the operating voltage of the laser diodes 13 and 15. The output 0/P from the fiber optic combiner 21 depends on the relative phases of the signals A and B. There are four possible relative phases as shown in FIG. 5. For A = B = 1 (region 1) and A = B = 0 (region 4), both laser diodes 13 and 15 are in a zero biased conditioned and, thus, no light is provided to the fiber optic combiner 21 and the output 0/P, is low or "0". For A = 0 and B = 1 (region 2) diode 13 is forward biased and therefore emits, causing the fiber optic combiner output 0/P to be in the high or "1" state. At the same time, diode 15 is reverse biased and does not emit. Alternatively, for A = 1 and B = 0 (region 3) diode 13 is reverse biased and does not emit; however, diode 15 is now forward biased and emits, producing a high or "1" state at the output of the fiber optic combiner 21. Thus, the conditions of (i) a high output state when either of the input states is high, and (ii) a low output state when the input states are both either high or low, clearly corresponds to the operation of an XOR gate. Operation of the XOR gate 11 is summarized in the Truth Table of FIG. 6. Since the laser diodes 13 and 15 are connected in a reverse fashion, they provide effective reverse bias protection for each other because whenever one of the diodes is subjected to reverse bias condition, the other is forward biased, limiting the voltage drop to approximately two volts.

The XOR gate of 11 can operate in response to electronic logic signals by eliminating the input photodetectors, switches, and amplifiers and applying the input signals directly to the input leads 17 and 19. Such modified XOR gates are used in one embodiment of the present invention, as will be seen.

Figure 7:
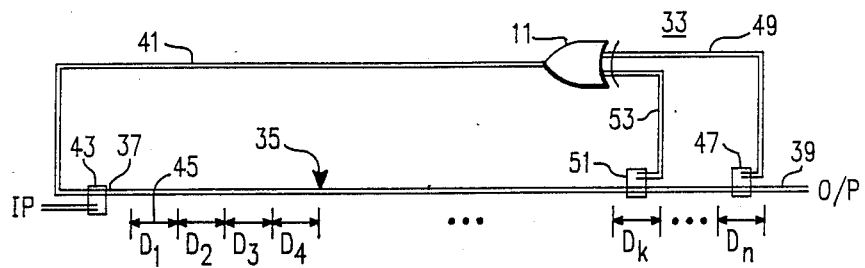
FIG. 7 is a single tap optical PN code generator in accordance with the teachings of the invention.

FIG. 7 illustrates a simple single tap PN code generator 33 in accordance with the invention. In this figure, and FIGS. 6 through 9, the XOR gate 11 of FIG. 5 is represented by the conventional XOR gate symbol. In FIG. 7, the PN code generator 33 includes the single XOR gate 11 and a fiber optic delay line 35. The delay line 35 has an input end 37 and an output end 39. The input end 37 of the fiber optic delay line 35 is connected to the optical output of the XOR gate 11 by an optic fiber 41 through an optical combiner 43. The optical combiner 43 also injects initializing optical pulses IP into the fiber optic delay line 35 at a preselected clock rate. The delay line 35 introduces a delay into the transmission of optical pulses received from the XOR gate 11 and the initializing pulses IP. It can be considered as having a plurality of delay stages which introduce delays $D_1$ to $D_n$. Each of these delay stages 35 is equal in length to the speed of the light pulses in the delay line divided by the clock rate of the initializing pulses. A first optical splitter 47 feeds back part of the optical signal appearing at the output end 39 of the fiber optic delay line to one of the optical inputs of the XOR gate 11 through optic fiber 49. A second optical splitter 51 is inserted into the delay line at a selected delay stage to feed back the pulse signal at that point in the delay line 35 to the other optical input of the XOR gate 11 through optic fiber 53.

The PN code generator 33 is initialized by introducing several pulses, IP, into the delay line 35 through the optical combiner 43. The exact number of these pulses depends on the number of the delay stages (i.e., the length of the fiber optic delay line 35).

In an electronic shift register, the signals advance in the shift register at the clock rate and neither the feedback connections nor the XOR gate add any delay. In the optical system of FIG. 7, the delay stages 45 and the markings Dl to Dn indicate arbitrary delay distances. It is very important to understand that the feedback fiber 41 is part of the delay line 35 and thus does not introduce any extra delay. On the other hand, the feedback fibers 49 and 53 can be essentially eliminated so that the optical splitters and 47 and 51 can be connected directly to the optical inputs to the XOR gate 11. No appreciable delays would be present in such an arrangement.

The speed of the PN generator 33 is determined by the capabilities of: (1) the optic fibers 35, 41 (and 49 and 53 if present), (2) the detectors 23 and 25, (3) the buffers 27 and 29 and (4) laser diodes 13 and 15. For all practical purposes the optic fibers can easily support more than 100 Gbits/s data rates. Photodetectors in the form of GaAs Schottky diodes operating at 100 GHz have been demonstrated. On the other hand, 25 GHz GaAs detectors are commercially available. Miniaturized buffers made out of GaAs FETs have already been demonstrated to operate in excess of 25 GHz. Finally, gain switched laser diodes that can produce pulses with a full width half mean (FWHM) of 15 psec have been demonstrated. The ultimate speed of the PN code generator 33 will be determined by the speed of the laser diodes in the XOR gate which is determined by the laser diode parasitics. In practice, they take the form of a resistance in series with laser diodes combined with shunt capacitance. The smallest resistance and capacitance values achieved so far have resulted in RC-limited laser diode operation in the 20-24 GHz range. In the XOR gate, the parallel connection of the two laser diodes increases the circuits capacitance by a factor of 2 which implies that the speed will be reduced by a factor of two as well. Thus, it can be seen that the PN code generator 33 is limited by the speed of the XOR gate 11 which is in the range of 10 to 12 Gbits/s. This is several times faster than currently available PN code generators.

The number of effective delay stages 45 in the PN code generator 33 is determined by the length of the optic fiber delay line 35 (and the fiber 41 if present) and thus can be extremely large at no cost to the code generator's speed. This means that virtually unlimited length PN sequences can be generated.

Figure 8:
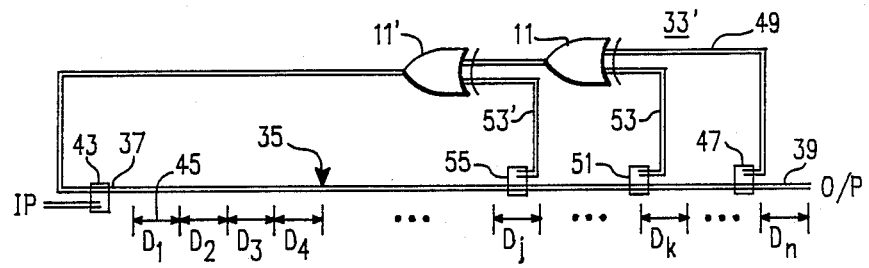
FIG. 8 is a schematic diagram of a multi-tap, serial-parallel optical PN code generator in accordance with the invention.

The single tap PN code generator of FIG. 7 can be modified to a multi-tap system via the addition of more feedback points and XOR gates. One arrangement of such a multi-tap system 33' is shown in FIG. 8 which includes a second XOR gate 11' connected in serial-parallel with the XOR gate 11. An additional optical splitter 55 inserted at another selected delay stage 45 in the fiber optic delay line 35 provides another feedback signal which is applied to the second optical input of the XOR gate 11'.

Figure 9:
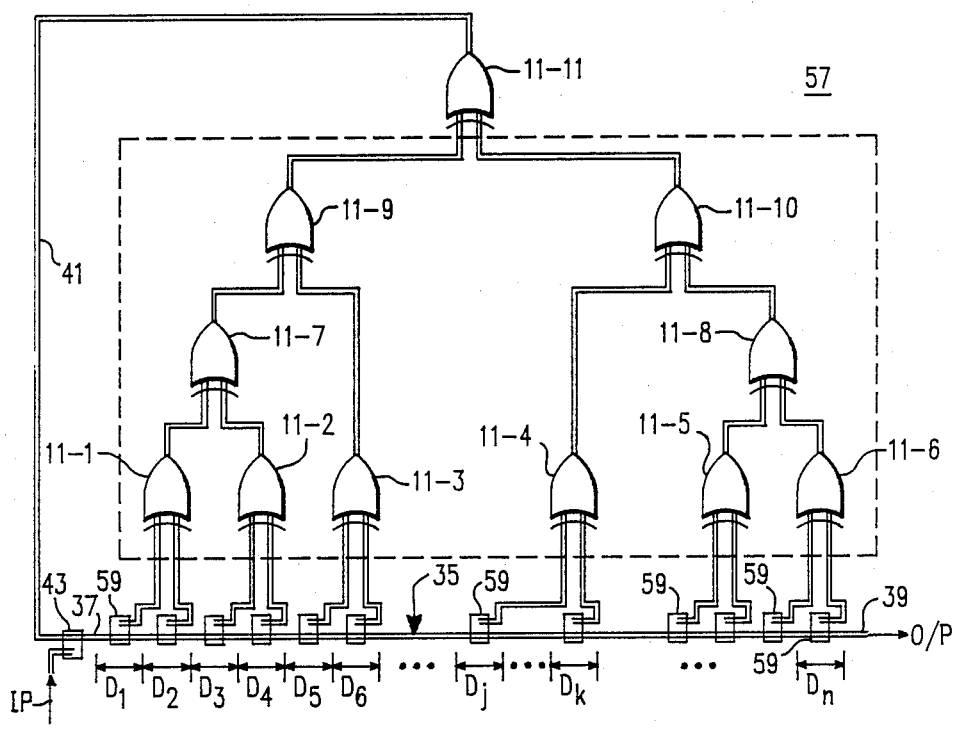
FIG. 9 is a schematic diagram of a tree-type parallel electro-optical XOR PN code generator in accordance with the invention.

While additional XOR gates can be inserted in serial-parallel with additional feedback loops in the manner illustrated in FIG. 8, it is preferred that multi-tap PN code generators be arranged with the XOR gates 11 in a tree-type parallel configuration as shown in FIG. 9 in order to minimize the total feedback delay. In this PN code generator 57, a selected number of the XOR gates, 11-1 to 11-6 in the example, have each of their optical inputs connected to optical splitters 59 at selected delay stage lengths 45 in the delay line 35. Feedback loops need not be provided from every delay stage in the fiber delay line 35 as shown in FIG. 9. Optic fibers 61 connect the XOR gates in a converging cascade arrangement from the selected number of XOR gate to funnel the pulses to a single XOR gate 11-11 which has its optical output connected to the optic fiber 41 which feeds the pulses back to the input of the fiber optic delay line 35. It is not necessary that feedback loops be provided from every delay stage of fiber optic delay line 35; however, this configuration provides the greatest flexibility in generating codes. With all the feedback paths available, any desired arrangement can be made through operation of the switches 30 and 31 (see FIG. 5).

It will be evident that other patterns for the XOR gates and delay lines can be arranged. It should be noted that the set of XOR gates shown in FIG. 9 essentially comprises a parity generator.

Figure 2:
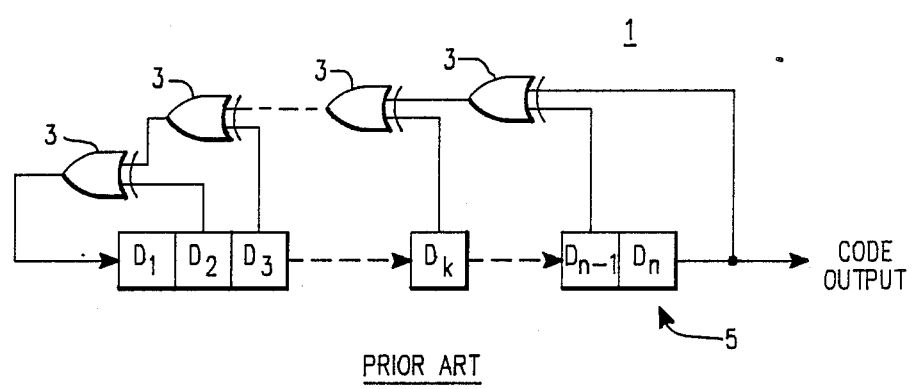
FIG. 2 is a schematic diagram of a prior art multi-tap electronic PN code generator.
Figure 3:
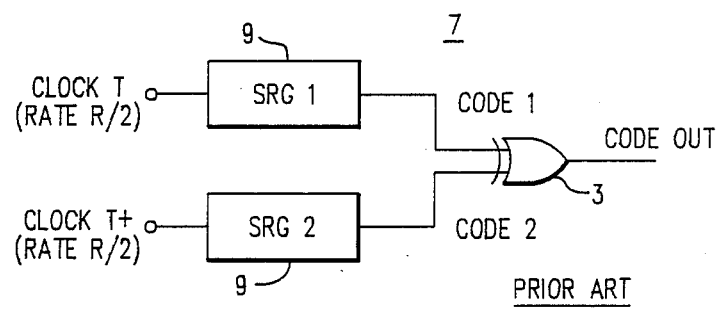
FIG. 3 is a schematic diagram of a prior art syncopated register electronic PN code generator.
Figure 10:
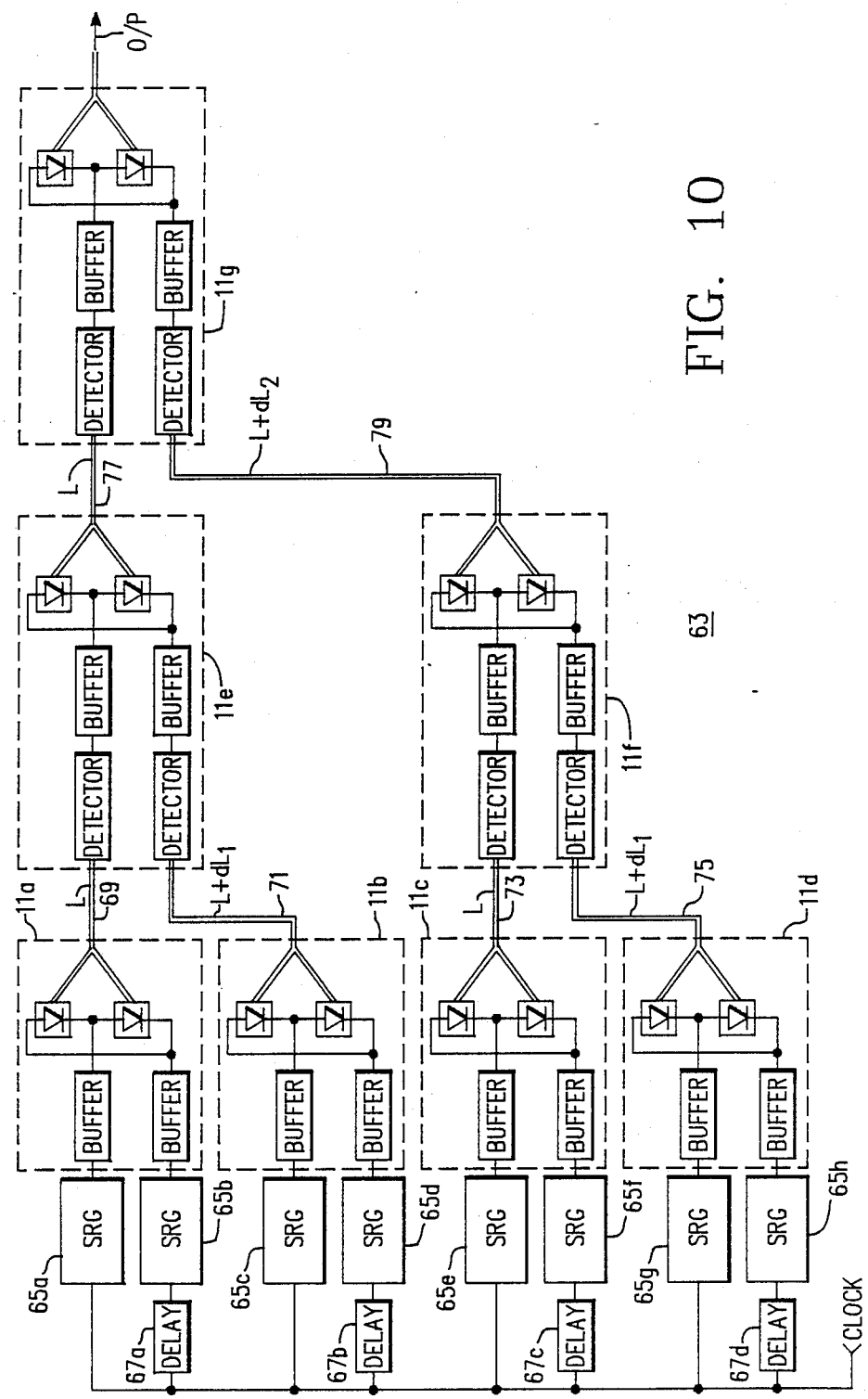
FIG. 10 is a schematic diagram of a syncopated PN code generator in accordance with the teachings of the invention.

Another embodiment of a PN code generator in accordance with the invention is shown in FIG. 10. This code generator 63 uses electro-optical XOR gates to multiplex the outputs of several syncopated low speed electronic PN code generators. In the exemplary system, eight shift register code generators (SRGs), 65a-65h, representing electronic PN code generators such as those shown in FIGS. 1 and 2 are arranged in pairs with the outputs of each pair XORed by a first set of XOR gates 11a-11d. As shown by the symbols used in FIG. 10, the first set of XOR gates 11a-11d have electronic inputs rather than optical inputs and hence are connected directly to the outputs of the SRGs. All of the SRGs are clocked by the same clock pulse. To achieve the required time shift, the clock for one SRG, 65b, 65d, 65f and 65h in each pair is delayed by an amount $T_b/2$, where $T_b$ is the clock pulse width and also the SRGs' output bit width. The clock delays are accomplished by an electronic delays 67a-67d. Due to the offset of the clock in each pair of SRGs, the output bit width of the first set of XOR gates, 11a-11d, is also equal to $T_b/2$.

The outputs of the first set of XOR gates, 11a-11d are multiplexed by a second set of XOR gates 11e, 11f and 11g which are connected in a converging cascade arrangement by optic fibers 69, 71, 73, 75, 77 and 79. The second set of XOR gates 11e, 11f and 11g each have two optical inputs and a single optical output. The output of the XOR gates 11a and 11b are XORed by the XOR gate 11e while the XOR gate 11f multiplexes the outputs of XORs 11c and 11d. To achieve the necessary time offset, the outputs from XOR 11b and 11d are delayed by an amount $T_b/4$ relative to the outputs from XORs 11a and 11c. This is accomplished by the use of different lengths, L and L+dL$_1$ for the optic fibers 69 and 73, and 71 and 75 respectively, where dL1 corresponds to a path delay equal to $T_b/4$. Due to the relative offset of the input sequences, the output bit width of XOR 11e and XOR 11f is equal to $T_b/4$.

The final operation in the syncopated code generator 63 is the XORing of the outputs of XORs 11e and 11f which are first shifted with respect to each other by an amount $T_b/8$. This is accomplished by the use of different length fibers 77 and fiber 79, where fiber 77 has a length L and fiber 79 has length L+dL$_2$, where dL$_2$ corresponds to a path delay equal to $T_b/8$. The bit width of the final output of the PN code generator 63, which appears as the output of the XOR gate 11g, is equal to $T_b/8$. Thus, it can be seen that the data rate is increased by a factor of 8. It should be clear that in the code generator 63, the speed requirement of the electronics, that is the shift register code generators 65a-65h is proportional to T, but the speed requirement of the optics is proportional to $T_b/N$, or N times that of the electronics. This is important because it allows the use of low speed electronics in order to achieve high speed data rate sequences.

As mentioned, the described syncopated SRG architecture is based on a tree-type configuration which has some advantages over a serial-type configuration where the eight SRGs would be XORed in a cascaded fashion. The main advantage is that the number of different delays required is equal to log$_2$N, where N is the number of SRGs used, versus N−1 delays for the serial type. Thus, for the exemplary encoder of FIG. 10 where N=8 only three different delays ($T_b/2$, $T_b/4$ and $T_b/8$) were needed while if the serial type were used, seven delays, $T_b/2-T_b/8$ would be required. Another advantage is timing accuracy. In a serial-type configuration, the timing accuracy of all SRGs relative to each other is a concern. With the architecture of FIG. 10, only the timing within the pairs of SRGs or XORs is a concern. Timing inaccuracies between sets of pairs are eliminated by adjustments in the connecting fiber lengths.

The ultimate speed of the code generator 63 depends mostly on the performance of the XOR gates which was discussed above. The accuracy with which the fiber lengths can be set is of the order of 1 mm. The corresponds to 10 psec which implies that the data rate limitation due to fiber inaccuracies is about 100 Gbits/s. It is also pointed out that the use of fibers allows for extra flexibility since only relative fiber lengths rather than actual fiber lengths are of concern.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A code generator generating pseudorandom digital codes comprising:
   a source of optical pulses;
   a plurality of optical XOR gates each having at least two optical inputs and one optical output; and
   optical fiber means interconnecting the optical outputs of selected of said XOR gates to selected inputs of other of said XOR gates in a pattern which generates a single optical output representing said pseudorandom digital code, said optic fiber means having lengths selected to effect selected delays in the transmission of light pulses between selected ones of said optical XOR gates.

2. The code generator of claim 1 wherein said optic fiber means comprises optic fibers connecting said plurality of optical XOR gates in a converging cascade arrangement funneling light pulses injected into a preselected number of said plurality of optical XOR gates to a single optical XOR gate, a fiber optic delay line having a plurality of delay stages between an input end and an output end and having the input end connected to the optical output of said single optical XOR gate, a plurality of optical splitters connecting selected ones of said delay stages in said delay line to the optical inputs of said preselected number of optical XOR gates, and an optical combiner connected to said source of optical pulses and to said delay line injecting initializing optical pulses into said delay line, said output end of said fiber optic delay line being said single output at which said pseudorandom digital code is generated as a sequence of light pulses.

3. The code generator of claim 1 wherein said source of light pulses comprises a plurality of pairs of syncopated electronic pseudorandom pulse code generators and an electronic to optical XOR gate having two electronic inputs and a single optical output for each pair of syncopated electronic pseudorandom pulse code generators with the output of each of the electronic pseudorandom pulse code generators in each pair connected to one of the electronic inputs of one of the electronic to optical XOR gates, and wherein said optic fibers comprise first pairs of optic fibers connecting pairs of said electronic to optical XOR gates to the optical inputs of one of said optical XOR gates, and additional pairs of optic fibers connecting the optical XOR gates in a converging cascade arrangement funneling light pulses to a single optical XOR gate the output of which is said pseudorandom digital code, said pairs of optic fibers including one fiber which is longer than the other by an amount which delays light pulses transmitted thereby by intervals separating in time pulses in said pseudorandom digital code resulting from pulses generated by the electronic pseudorandom pulse code generators.

4. A code generator for generating a pseudorandom optical pulse code from a series of input light pulses having a selected clock rate:

at least one XOR gate having two optical inputs and one optical output;

a fiber optic delay line having a length equal to a selected number of delay stages, with each delay stage length being equal to the speed of light in said fiber optic delay line divided by said clock rate, said fiber optic delay line having an input end connected to the optical output of said XOR gate and an output end at which said pseudorandom optical pulse code is generated;

a first optical splitter adjacent said output end of said delay line feeding back light pulses appearing at the output end of said delay line to one of said optical inputs to said XOR gate;

a second optical splitter inserted into said fiber optic delay line at a selected number of delay stages from the input end of said fiber optic delay line feeding back light pulses in said fiber optic delay line into the other optical input of said XOR gate; and an optical combiner injecting said input light pulses into said fiber optic delay line.

5. The code generator of claim 4 wherein said XOR gates each comprise first and second diode-type light sources each having a cathode and an anode, first and second electrical leads connecting said first and second diode-type light sources back to back in parallel with the anode of each diode-type light source connected to the cathode of the other diode-type light source, first and second optical detectors serving as the inputs to said XOR gate and connected to said first and second electrical leads respectively, and a two to one optical combiner having first and second inputs gathering light emitted from the first and second diode-type light sources respectively and a single output forming said optical output of said XOR gate.

6. The code generator of claim 5 wherein said diode-type light sources are laser diodes.

7. The code generator of claim 5 including amplifiers connected between said optical detectors and said first and second electrical leads.

8. The code generator of claim 4 including a second XOR gate having two optical inputs and a single optical output connected between the optical output of said at least one XOR gate and the input of the delay line with the output of said at least one XOR gate connected to one of said optical inputs of the second XOR gate and the output of the second XOR gate connected to the input end of the fiber optic delay line, and including a third optical splitter inserted in said delay line a predetermined number of delay stages from the input of said fiber optic delay line feeding back optical pulses from the delay line to the second optical input to said second XOR gate.

9. The code generator of claim 4 including multiple XOR gates each having two optical inputs and a single optical output, optic fibers connecting said plurality of XOR gates in a converging cascade arrangement funneling light pulses fed back into a preselected number of said plurality of XOR gates to a single XOR gate, and a plurality of optical splitters feeding back light pulses from selected ones of said delay stages in said delay line to the optical inputs of said preselected number of XOR gates, the optical output of said single XOR gate being connected to the input end of said delay line.

10. The code generator of claim 9 wherein said XOR gates each comprise first and second diode-type light sources each having a cathode and an anode, first and second electrical leads connecting said first and second diode-type light sources back to back in parallel with the anode of each diode-type light source connected to the cathode of the other diode-type light source, first and second optical detectors serving as the inputs to said XOR gate and connected to said first and second electrical leads respectively and a two to one optical combiner having first and second inputs gathering light emitted from the first and second diode-type light sources respectively, and a single output forming said optical output of said XOR gate.

11. The code generator of claim 10 including amplifiers connected between said optical detectors and said first and second electrical leads.

12. The code generator of claim 10 including in at least one of said XOR gates, switches in said electrical leads for selecting paths for light pulses through said XOR gates.

13. The code generator of claim 12 including amplifiers connected between said optical detectors and said first and second electrical leads in at least some of said XOR gates.

14. The code generator of claim 13 wherein said diode-type light sources are laser diodes.

15. A code generator for generating a pseudorandom optical pulse code from a series of input light pulses comprising:

a plurality of XOR gates having at least two optical inputs and a single optical output;

optical fibers connecting said plurality of XOR gates in a converging cascade arrangement funneling optical pulses from a preselected number of said plurality of XOR gates to a single XOR gate;

a fiber optic delay line having a plurality of delay stages between an input end and an output end with said input end connected to the optical input of said single XOR gate and with the pseudorandom optical pulse code being produced at the output end of said fiber optic delay line;

a plurality of fiber optic splitters in said delay line connecting selected ones of said delay stages in said delay line to the optical inputs of said preselected number of XOR gates; and an optical combiner connected to the input end of said delay line injecting said input light pulses into said fiber optic delay line.

16. The code generator of claim 15 wherein said XOR gates each comprise first and second diode-type light sources each having a cathode and an anode, first and second electrical leads connecting said first and second diode-type light sources back to back in parallel with the anode of each diode-type light source connected to the cathode of the other diode-type light source, first and second optical detectors serving as the inputs to said XOR gate and connected to said first and second electrical leads respectively, and a two to one optical combiner having first and second inputs gathering light emitted from the first and second diode-type light sources respectively, and a single output forming said optical output of said XOR gate.

17. The code generator of claim 16 wherein said diode-type light sources are laser diodes.

18. The code generator of claim 17 including amplifiers connected between said optical detectors and said first and second electrical leads.

19. The encoder of claim 18 including in at least one of said XOR gates, switches in said electrical leads for selecting paths for light pulses through said XOR gates.

20. A code generator for generating pseudorandom optical pulse codes comprising:
a clock generating clock pulses at a selected clock rate;
a plurality of pairs of electronic pseudorandom code generators each generating an electronic pulse code in response to said clock pulses;
means delaying clock pulses to one electronic pseudorandom code generator in each pair of electronic code generators by one half said clock rate;
a first set of XOR gates having two electronic inputs and a single optical output, with each of said first set of XOR gates having its electronic inputs connected to one of said pairs of said electronic pseudorandom code generators;
a second set of XOR gates having two optical inputs and two optical outputs; and
pairs of optical fibers connecting said XOR gates in successive converging cascaded stages funneling pulses from said first set of XOR gates to a single XOR gate in said second set of XOR gates, said pairs of optical fibers comprising one optical fiber which exceeds the length of the other optical fiber in the pair by an amount which delays pulses transmitted by said one optical fiber by one half the bit width of pulses transmitted by the pair, optical pulses appearing at the optical output of said single XOR gate in said second set being said pseudorandom optical pulse code.

21. The code generator of claim 20 wherein said XOR gates each comprise first and second diode-type light sources each having a cathode and an anode, first and second electrical leads connecting said first and second diode-type light sources back to back in parallel with the anode of each diode-type light source connected to the cathode of the other diode-type light source, and a two to one optical combiner having first and second inputs gathering light emitted from the first and second diode-type light sources respectively and a single output forming said optical output of said XOR gate said second set of XOR gates further including first and second optical detectors serving as the inputs to said XOR gate and connected to said first and second electrical leads respectively.

22. The code generator of claim 21 including amplifiers connected between said optical detectors and said first and second electrical leads in said second set of XOR gates.

23. The code generator of claim 22 wherein said diode-type light sources comprise laser diodes.

* * * * *